United States Patent [19]

Pommer

[11] Patent Number: 4,934,331
[45] Date of Patent: Jun. 19, 1990

[54] ADDITIONAL AIR SUPPLY MEANS FOR AN INTERNAL COMBUSTION ENGINE

[76] Inventor: Fredi A. Pommer, Bogenstr, 1, 5630 Remscheid, Fed. Rep. of Germany

[21] Appl. No.: 363,249

[22] Filed: Jun. 8, 1989

[30] Foreign Application Priority Data

Jun. 9, 1988 [DE] Fed. Rep. of Germany ....... 3819618

[51] Int. Cl.$^5$ ........................................... F02M 23/08
[52] U.S. Cl. ................................................... 123/587
[58] Field of Search ................. 123/585, 587, 308, 432

[56] References Cited

U.S. PATENT DOCUMENTS

| | | | |
|---|---|---|---|
| 3,943,899 | 3/1976 | Matsuoka et al. | 123/585 |
| 4,292,944 | 10/1981 | Matsumoto et al. | 123/308 |
| 4,313,410 | 2/1982 | Kunii et al. | 123/585 |
| 4,467,760 | 8/1984 | Namba et al. | 123/308 |

Primary Examiner—Willis R. Wolfe
Assistant Examiner—M. Macy
Attorney, Agent, or Firm—Andrus, Sceales, Starke & Sawall

[57] ABSTRACT

An apparatus for supplying additional air into the intake port of an internal combustion engine is described. The apparatus includes an additional air discharge means protruding into the intake port of the internal combustion engine and formed as nozzle tube. The nozzle tube is disposed at the combustion chamber end of the intake port directly adjacent to the inlet valve. Furthermore, the apparatus comprises an additional air flow rate controller and an additional air supply line between the nozzle tube and the flow rate controller. A vacuum line for the detection of vacuum and for the application of vacuum to the controller for the operation thereof leads from the intake port to the flow rate controller.

18 Claims, 6 Drawing Sheets

ADDITIONAL AIR SUPPLY MEANS FOR AN INTERNAL COMBUSTION ENGINE

The present invention is directed to means for supplying additional air into the suction manifold of an internal combustion engine downstream of the throttle valve, said means comprising an additional air discharge device, a flow rate controller for the additional air, an additional air supply line between the additional air discharge device and the flow rate controller and a vacuum line leading from the suction manifold to the flow rate controller for the detection of vacuum and for the application of vacuum to the controller for the actuation of the same.

Such means is known from German patent letter 33 43 797. According to this known means the additional air discharge device has the shape of a hollow web comprising a plurality of slot-like discharge apertures for the additional air opening into the suction manifold. This hollow web is located within a distributor intermediate member which is mounted in the suction manifold in a position adjacent to the throttle valve. A flow rate controller disposed in the additional air supply line controls the additional air supply in response to the vacuum residing upstream of the throttle valve within the suction manifold i.e. in response to the respective load conditions.

With such devices a lean fuel-air-mixture as well as a better distribution of this mixture within the combustion chambers of the internal combustion machine is attained by the introduction of additional air into the suction manifold. By this the proportion of pollutants within the exhaust gas (CO, CH and $NO_x$) can be reduced.

As mentioned above, with the known device the additional air is introduced into the suction manifold relatively close to the throttle valve. Obviously, a relative large distance is present from the point of introduction of the additional air down to the corresponding combustion chambers of the internal combustion machine which has the result that the turbulences developed by the introduction of additional air can be reduced until the respective combustion chambers are reached so that the desired swirl effect can be reduced or can be totally lost. Furthermore, the necessary incorporation of the distributor intermediate member has the disadvantage that the necessary installation height of the internal combustion engine under the engine hood increases so that space problems result.

The invention is based on the problem to provide a means of the cited kind which assures an excellent efficiency and which is formed and can be mounted especially simply and compact.

According to the invention this problem is solved with means of the cited kind such that the additional air discharge device is formed as nozzle tube which is associated with one combustion chamber of the internal combustion engine, respectively, which extends through the wall bore of the respective intake port and which includes a throttle and air discharge aperture at the forward end, said nozzle tube being located at the combustion chamber end of the intake port directly adjacent to the inlet valve.

The inventive solution turns away from the incorporation of a special intermediate member into the suction manifold and provides in the place of this a nozzle tube extending through a wall bore of the intake port of the respective combustion chamber of the internal combustion engine and being suitably mounted in the corresponding wall. By this design of the additional air discharge device the construction height of the internal combustion engine is not increased. Furthermore since the nozzle tube is not located at the common suction manifold but at the respective intake port of the corresponding combustion chamber of the internal combustion engine the distance combustion chamber—introduction point of additional air is minimized so that the swirl effect caused by the introduction of additional air is completely maintained up to the combustion chamber.

The fuel-air-mixture sucked from the respective combustion chambers of the internal combustion engine which flows around the nozzle tube protruding into the intake port produces a vacuum in the nozzle tube or the corresponding additional air supply line so that additional air is sucked in this way and flows into the intake port. This additional air impinges onto the fuel-air-stream within the intake port approximately rectangularly whereby a lateral force is applied to the fuel-air-stream which produces a swirling of the same.

The corresponding flow rate of the additional air is controlled by a controller which is operated in response to the vacuum residing within the suction manifold and thus in response to the respective load condition of the internal combustion engine.

The inventive means has a simple design and can be mounted simply. For mounting the nozzle tube a corresponding bore has to be provided in the respective intake port. In this bore the rear portion of the nozzle tube is fixed by means of suitable securing means. For instance, the additional air supply line can be a hose which is connected to the rear end of the nozzle tube by means of a suitable fitting. Due to the simple construction and the simple mounting of the inventive means the same is especially suited for very small motors (boat motors, lawn-mowers etc.). However, it can also be used in connection with internal combustion engines having a plurality of combustion chambers (cylinders) wherein in such an embodiment a nozzle tube is associated with each intake port of a combustion chamber, the nozzle tube being connected to a common flow rate controller for the additional air by means of a corresponding additional air supply line (hose line).

A high oxygen excess within the exhaust gas is reached by the additional air introduced with the inventive means, said oxygen excess generating a corresponding reduction of the pollutants. With this means Lambda values up to 1,3 can be reached dependent on the kind of the internal combustion engine. Especially, due to the lean combustion process a relative low proportion of nitrogen oxides within the exhaust gas is generated. A further reduction of the pollutants in connection with the inventive means is attained by the provision of a catalyzer within the exhaust gas system. However, due to the provision of the inventive means the corresponding catalyzer can have a substantially lower cell number than comparable systems without use of the inventive means. Accordingly, the costs with regard to the incorporation of a catalyzer (nobel metal amount) can be correspondingly reduced.

The nozzle tube is located in the direct vicinity of the corresponding inlet valve. It preferably protrudes up to approximately the middle of the intake port. A turbulent flow is generated by this lateral application of additional air to the sucked mixture stream, which turbulent flow continues up to the combustion chamber. By this, a homogeneous lean mixture is attained. Practically, the nozzle tube has in its portion protruding into the intake port a roof-like slope which brings along a distribution and deflection of the mixture stream which is promoted by the corresponding swirl effect. Preferably, the forward end of the nozzle tube is sloped towards the combustion chamber and the wall bore. This slope has the function of a break-away edge and assures proper suction of additional air from the nozzle tube.

By the provided throttle a corresponding rise of the velocity of the supplied additional air stream is reached. The throttle has the shape of a calibrator bore which is formed in the rear portion of the nozzle tube, preferably outside of the intake port. By this, an absolute limitation of the flow rate of the additional air is attained which is adapted to the respective internal combustion engine. Behind this throttle the cross-section of the nozzle tube is enlarged again up to the discharge end.

As already mentioned, with the inventive means the flow rate of the additional air is controlled in response to the respective engine load, i.e. the vacuum residing within the suction manifold or the suction port. This vacuum is received by means of a vacuum line and is supplied to a control chamber of the flow rate controller of the additional air. A working member is located within this control chamber. On the one side the vacuum of the vacuum line is applied to the working member while on the other side the atmosphere pressure is applied to the same. The working member actuates a control valve varying the flow section of an additional air chamber in response to the pressure conditions which are established. On the one side the additional air chamber is connected to the additional air supply line and on the other side the same is connected to the atmosphere (by means of a suitable air filter). According to an internal combustion engine having a plurality of combustion chambers the additional air chamber of the controller is connected to a plurality of additional air supply lines the number of which corresponds to the number of the combustion chambers of the internal combustion engine. Preferably, this is realized by a construction according to which the atmosphere connection of the additional air chamber of the controller comes from below while the several additional air supply lines emanate from the additional air chamber laterally. According to this embodiment a corresponding air filter can be mounted in a simple manner at the bottom of the housing of the flow rate controller.

The control valve moving within the additional air chamber is preferably formed as a hollow piston which is open at the bottom and which blocks or opens several discharge ports to the additional air supply lines. The piston is connected to the working member within the control chamber by means of a suitable piston rod. This working member is preferably formed as a diaphragm and is biased by the spring wherein the working member is preferably biased into an opening position of the associated piston. Accordingly, the vacuum from the vacuum line applied to the working member works against the force of a corresponding spring.

Practically, the atmosphere connection of the control chamber is also provided with an air filter. This filter has a relatively small flow section in order to attain a delayed ventilation.

The ports to the respective additional air supply lines are preferably formed as slots.

Since the suction manifold vacuum is very different with internal combustion engines, a vacuum controller is preferably provided within the vacuum line between the detection point at the suction port and the flow rate controller for a better control of the additional air flow rate controller. For instance, this can be a control member varying the flow section of an opening of the vacuum line which is connected to the atmosphere. For this, one can take for instance a manually adjustable adjustment screw which opens the opening leading to the atmosphere more or less. Accordingly, the inventive means can be optimized with respect to the respective internal combustion engine by adjustment of the adjustment screw.

Furthermore, practically a check valve blocking the flow section of the vacuum line is provided in the vacuum line between the detection point at the suction port and the additional air flow rate controller. This check valve can be located together with the control member in a housing which is incorporated into the vacuum line. The check valve prevents vacuum intervals occuring with one or two-cylinder engines and two-stroke engines. Furthermore, it secures a certain vacuum storage for a cold start.

The inventive means operates in the following manner:

When the corresponding internal combustion engine runs in its idle condition, the additional air flow rate controller is actuated by the strong idle vacuum against the spring force of the working member such that the corresponding control valve closes so that no additional air is introduced into the suction port. Upon increase of the speed and decrease of the vacuum generated thereby the spring pressure applied to the working member becomes effective so that the control valve is opened. Upon sudden acceleration of the engine a delay is attained by the throttled ventilation of the control chamber whereby transition mistakes are avoided. If the speed is reduced and the suction manifold vacuum increases thereby, an overenriching is avoided by means of the closing delay of the control member (piston) by stopping of the wall wetting through the introduction of additional air. Under these circumstances one reaches an essential reduction of pollutants, even during coasting.

With internal combustion engines having a vacuum adjustor for adjusting the ignition time in response to the engine output or engine load, the vacuum detection according to the inventive means can be also carried out by means of the vacuum line leading from the suction manifold to the ignition distributor (early spark means, late spark means).

According to another embodiment of the invention, in opposition to the above-described embodiments, no vacuum line leading from the suction manifold to the flow rate controller is used for the detection of vacuum and for the application of vacuum to the controller for the operation of the same. In place of that, the flow rate controller is mechanically controlled, that is in response to the position of the throttle valve. This embodiment is especially used with very small engines, for instance for lawn mowers, and is sufficient for such engines. Accordingly, with increasing opening degree of the throttle valve the controller is controlled such that it supplies more additional air to the nozzle tube so that also more additional air is introduced into the intake port.

According to the invention, for the provision of the air discharge opening of the nozzle tube substantially two possibilities are provided. According to the first possibility the air discharge opening is located at the front side of the nozzle tube, i.e. the additional air introduced into the intake port is introduced in the axial direction of the nozzle tube. According to a further advantageous embodiment of the invention at least one air discharge opening is laterally located at the nozzle tube. Accordingly, according to this embodiment the additional air is laterally discharged into the intake port wherein preferably three air discharge openings are spaced in the axial direction of the nozzle tube. These three air discharge openings are preferably located offset with respect to one another on different sides of the roof-like slope of the nozzle tube, i.e. two on one side and one of the other side.

The roof-like slope of the portion of the nozzle tube protruding into the intake port can be located not only in the upper but also in the lower portion of the nozzle tube. If it is located in the lower portion, the nozzle tube necessarily becomes narrower downwardly. This embodiment has the advantage that a good suction effect is generated by the mixture flowing in the intake port and entering of the mixture into the discharge openings is prevented.

In order to prevent backpressure phenomenon which can possibly occur when the inlet valve is still opened and the compression stroke begins, according to a further embodiment of the invention a flutter valve is provided within the nozzle tube. This flutter valve is spring-biased against the flow direction of the additional air so that the flutter valve blocks the flow section of the nozzle tube upon corresponding backpressure phenomenon according to which, especially in the low speed range, a part of the sucked mixture is pressed into the nozzle tube, while the flutter valve opens the flow section in the flow direction of additional air upon a corresponding pressure decrease without these backpressure phenomenon. Such a flutter valve is especially suited in connection with a nozzle having one hole since there the danger of flowing back is especially high.

In the following the invention is explained in detail by means of special embodiments in connection with the drawing. The drawings FIG. 1 a diagrammatic representation of a means for supplying additional air.

Figure 1:
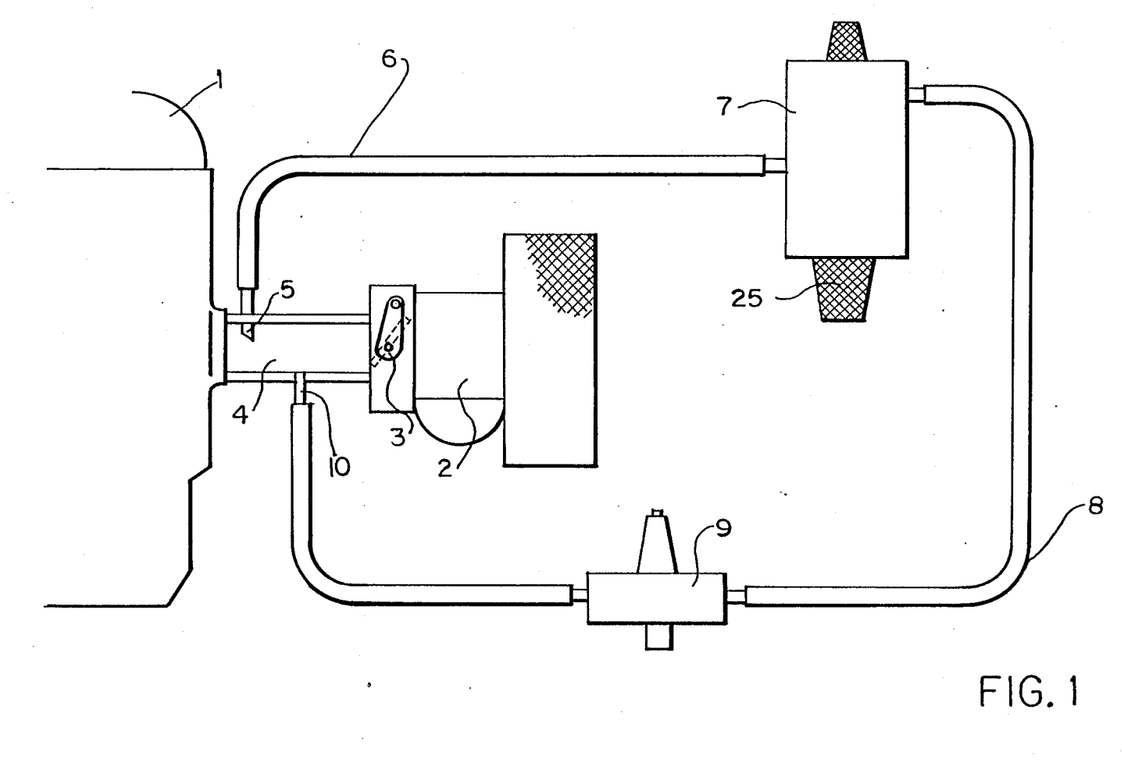

FIG. 1 shows a diagrammatic part-view of a conventional one-cylinder internal combustion engine which is provided with means for supplying additional air into the suction manifold of the engine. The view shows an engine block 1 which is connected to a carburetor 2 by means of a suction manifold or intake port 4. A throttle valve 3 is located downstream of the carburetor. The internal combustion engine operates conventionally such that air sucked through an air filter is converted into a fuel-air-mixture which is sucked into the combustion chamber of the single cylinder of the engine block 1 by means of the intake port 4. The intake port 4 is closed with regard to the combustion chamber by an inlet valve which is not shown.

A nozzle tube 5 is located within the intake port directly adjacent to the inlet valve. Additional air is introduced into the intake port by means of this nozzle tube. The nozzle tube extends through a bore in the wall of the intake port into the interior of the intake port and protrudes into the same about a distance of approximately 15-20 mm. The nozzle tube 5 is connected to an additional air supply line 6 at its rearward end, the supply line 6 being a hoseline with a diameter of 6-8 mm. The additional air supply line 6 is connected to an additional air flow rate controller 7 the construction which is later explained in detail. The flow rate controller 7 has an atmosphere connection and a connection for the additional air supply line 6 and generates a controlled air supply from the atmosphere connection to the additional air supply line.

The controller 7 works in response to the engine output or the engine load, i.e. the additional air flow rate is controlled in response to the engine output or the engine load. This is realized by means of the vacuum residing within the intake port 4. For this, the vacuum is detected at a suitably position within the intake port. According to this embodiment the detection point 10 is located opposite to the nozzle tube 5. From this detection point a vacuum line 8 leads to a controlled chamber within the additional air flow rate controller 7. A vacuum valve 9 is provided between the detection point 10 and the flow rate controller 7. This vacuum valve 9 contains a check valve and vacuum control member which are described later on in detail.

Figure 2:
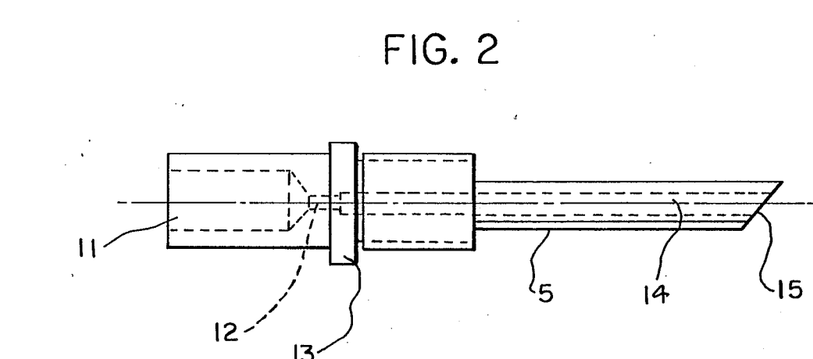
FIG. 2 a representation of the nozzle tube of the means.

FIG. 2 shows the construction of the nozzle tube 5. In the longitudinal direction the nozzle tube has portions with different diameters and in its interior a longitudinal bore comprising also portions of different diameter. A portion serving for the mounting of the hose line for supplying additional air is provided at the rearward end of the nozzle tube. This portion is joined by an enlarged portion 13 serving as flange for the attachment at the intake port. The portion of the nozzle tube 5 protruding into the intake port 4 has the smallest diameter and is sloped at its front side, i.e. the discharge opening of the additional air, as shown at 15. The upper part of this portion of the nozzle tube has a roof-like slope 14 which causes a separation of the mixture flow within the intake port. Preferably, the two roof surfaces of this slope form an angle of 120° with respect to one another while the slope at the forward end of the nozzle tube has an angle of 45° with respect to the vertical.

In its interior the nozzle tube has substantially three bore portions with different diameters. A bore portion with great diameter extends from the rearward end and narrows into a bore portion with small diameter (throttle 12). The throttle then enlarges into a bore portion with intermediate diameter extending up to the forward end of the nozzle tube.

The nozzle tube is fastened at the intake port with suitable attachment means. For this, means known to the expert in the art can be used.

Figure 3:
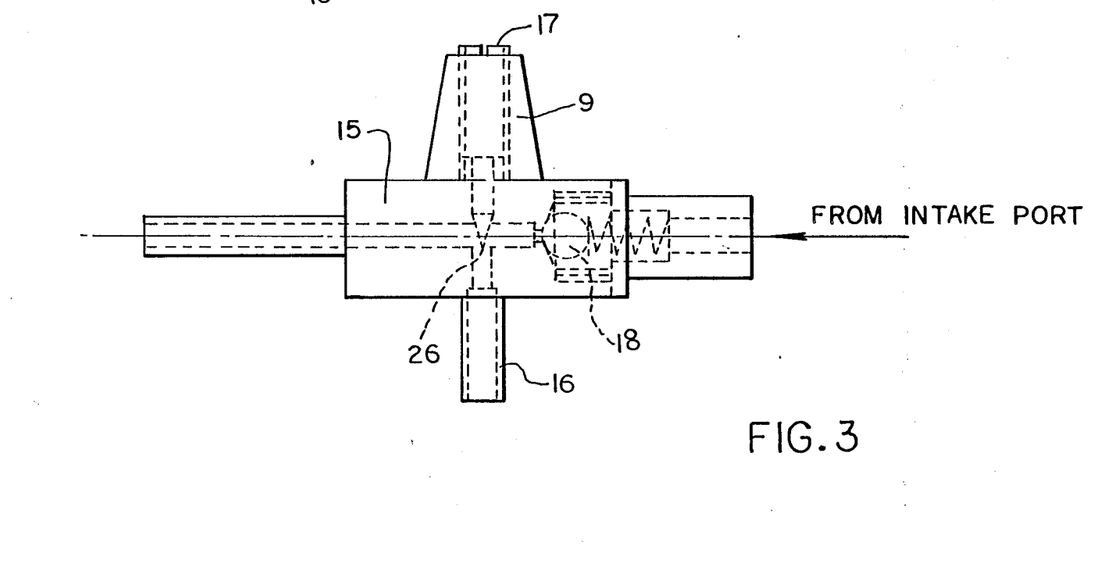
FIG. 3 a representation of the vacuum controller.

The vacuum line 8 leads from the detection point 10 of the suction manifold, which can be a suitable bore with a corresponding fitting at which the vacuum line is mounted, to the vacuum valve 9. The vacuum valve 9 has a suitable housing 15 which is provided with four openings. The first two openings are the flow openings for the vacuum line 8 leading from the detection point to the additional air flow rate controller. The third opening 26 leads to the atmosphere, and the fourth opening corresponds to a bore in which an adjustment screw 17 is located with which the flow section of the opening 26 leading to the atmosphere can be controlled. Accordingly, the vacuum line can be brought in connection with the atmosphere more or less by means of the adjustment screw 17, and thus the vacuum residing at the flow rate controller can be increased or decreased. Furthermore, in the housing of the vacuum valve 9 a check valve having a ball 18 and a corresponding spring 19 is disposed. This check valve prevents that vacuum intervals occur. It opens only if the vacuum present within the intake port applies a greater force to the ball 18 than the spring 19 pressing the ball against a valve seat.

Figure 4:
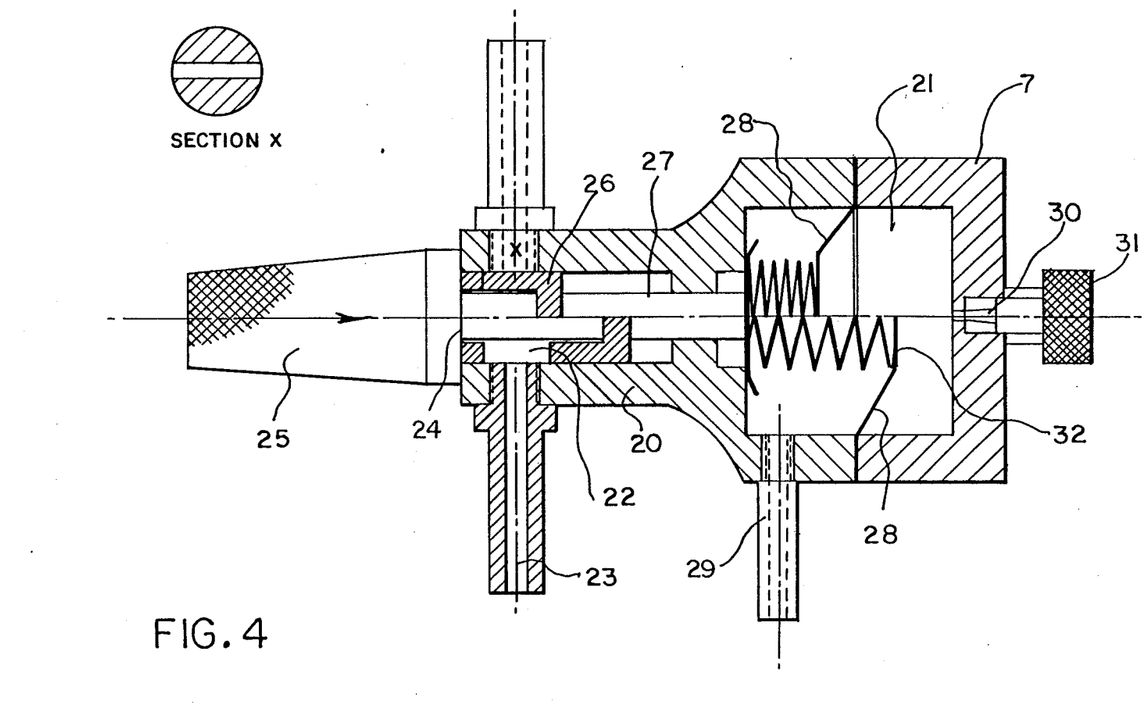
FIG. 4 a representation of the additional air flow rate controller.

The construction of the additional air flow rate controller 7 is shown in FIG. 4 in detail. The controller has a housing 20 comprising an upper control chamber 21 and a lower additional chamber 22. A working member 28 having the shape of a diaphragm is located approximately in the center of the control chamber. The upper side of the diaphragm is connected to the atmosphere pressure by means of an opening 30 leading to the atmosphere while vacuum is applied to the lower side thereof by means of a connection 29 connected to the vacuum line 8. The opening 30 leading to the atmosphere is correspondingly restricted and is provided with an air filter 31. A pressure spring 32 which is furthermore disposed in the control chamber 21 presses the diaphragm into its upper end position if both part chambers are pressure-balanced.

A piston rod 27 is attached to the lower side of the diaphragm. The piston rod is guided into the additional air chamber 22 in a gas-tight manner and has a control member with the shape of a piston 26 at its lower end, the wall of the piston engaging the wall of the additional air chamber 22 tightly. The piston 26 is open at its bottom. According to the shown embodiment, apart from the opening for the guidance of the piston rod, the additional air chamber 22 has three further openings of which two are laterally positioned and one is positioned at the bottom. The two lateral openings have suitable connections 23 for the connection of additional air supply lines 6. Since the system described here is a one cylinder internal combustion engine, only one connection and one additional air supply line are necessary. Accordingly, the other connection is closed and can be used in connection with engines having two cylinders.

The downwardly extending opening 24 is a connection with the atmosphere and is connected to a suitable air filter 25.

In the left half of the representation the flow rate controller is shown in the idle condition of the corresponding internal combustion engine, i.e. a very high vacuum is applied to the diaphragm by means of the connection 29 and pulls the diaphragm downwardly against the force of the spring 32 so that the piston 26 closes the connection 23 leading to the additional air supply line and formed as slot. If upon increased speed of the engine the vacuum gradually decreases, the spring presses the diaphragm upwardly so that the piston gradually releases the corresponding control slot of the connection 23. Accordingly, additional air can be discharged into the intake port 4 by means of the opening 24 leading to the atmosphere, the connection 23 and the additional air supply line 6.

In the right half of the representation the piston 26 completely releases the control slot of the connection 23, i.e. the spring 32 has pressed the diaphragm into its upper end position. Accordingly, no vacuum is present at the connection 29.

Figure 5:
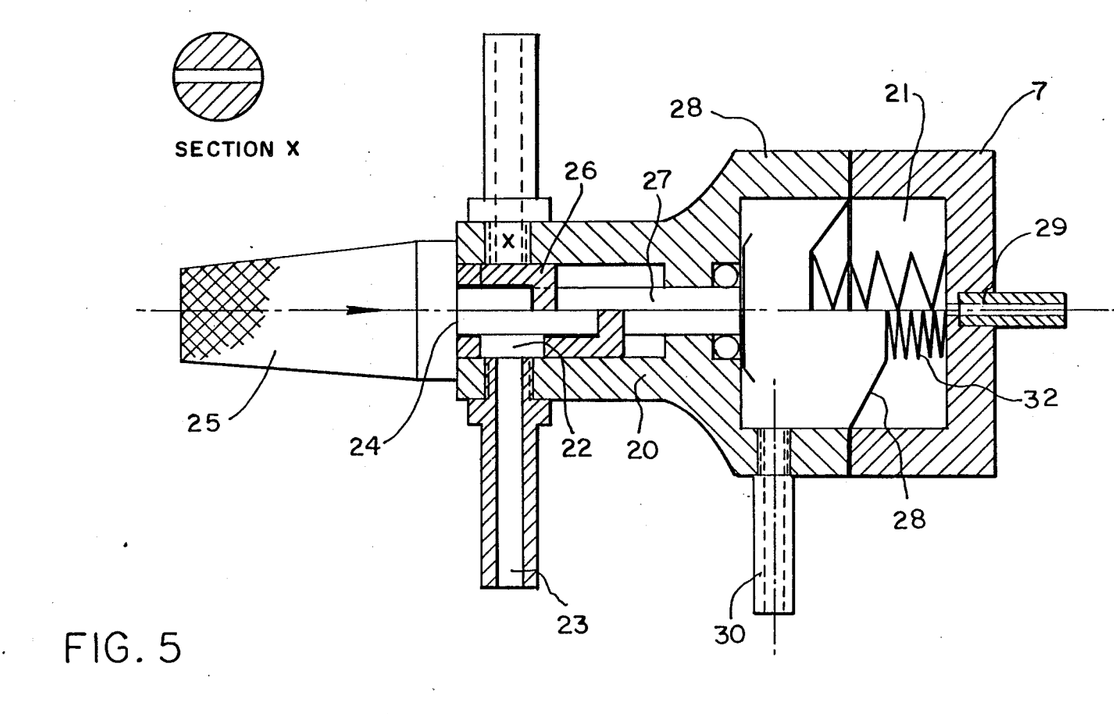
FIG. 5 a representation of the additional air flow rate controller wherein the vacuum detection is realized by a vacuum line leading to the early spark means of the ignition distributor.

FIG. 5 shows a variant of the additional air flow rate controller according to which the vacuum connection and the atmosphere connection are interchanged with one another within the control chamber. This variant is suited for internal combustion engines having a vacuum line leading to the ignition distributor. Here, the diaphragm is biased from above by a suitable pressure spring. With regard to the remaining details, the construction of the controller corresponds to that of FIG. 4.

Figure 6:
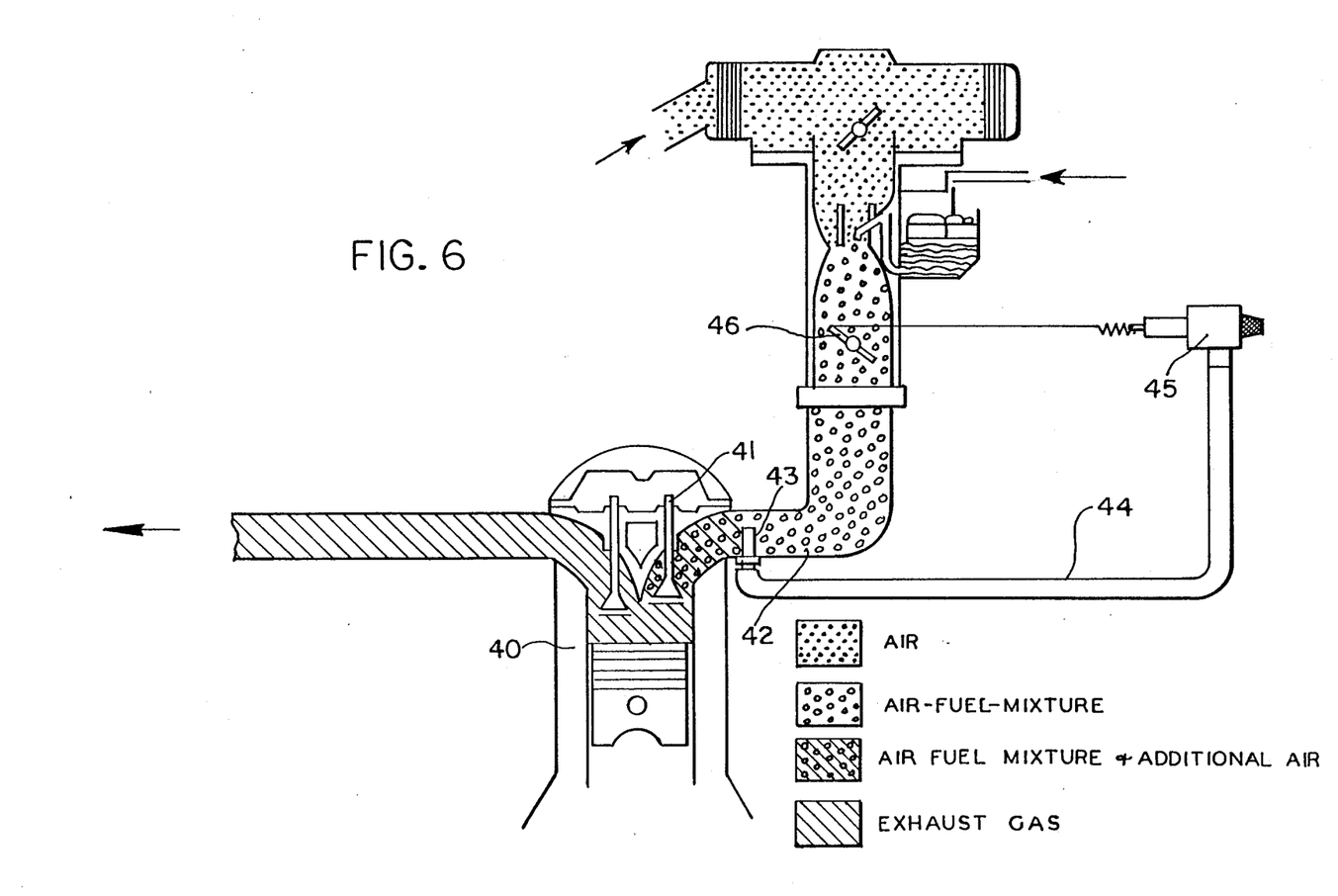
FIG. 6 a diagrammatic representation of a further embodiment of a means for supplying additional air.

In opposition to the above-described embodiment, according to a further embodiment of an additional air supply means shown in FIG. 6 the additional air flow rate controller 45 is not controlled by means of vacuum detection but mechanically by the position of the throttle valve 46. As to the remaining aspects the construction of the additional air supply means corresponds to that of the above-described embodiment. Also according to the new embodiment an additional air supply line 44 from the flow rate controller 45 to a nozzle tube 43 disposed at the combustion chamber end of an intake port 42 directly adjacent to the inlet valve 41 is provided. Additional air is introduced into the intake port 42 through this nozzle tube 43 so that the corresponding combustion chamber 40 receives a lean air-fuel-mixture which is shown in FIG. 6 hatched and with small circles. The original air-fuel-mixture is characterized with small circles while the sucked air is shown in a dotted manner. The corresponding exhaust gas is shown in a hatched manner.

Accordingly, according to this embodiment a great amount of additional air is introduced into the line 44 by the controller 45 if the throttle valve 46 is wide open so that a great amount of additional air is introduced into the intake port by means of the nozzle tube. Vice versa only a small amount of additional air is introduced if the throttle valve is slightly opened.

It has to be supplemented that even such a mechanical control of the additional air supply is not necessary with engines having a constant speed, as for instance with sweeping machines. With such engines no control member at all is necessary.

Figure 7A:
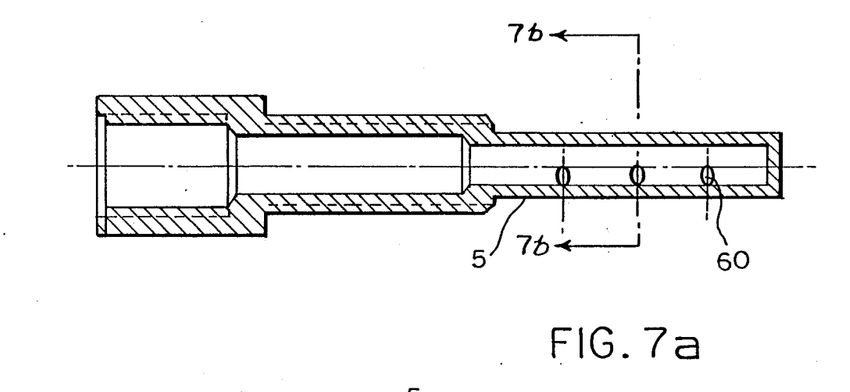
FIGS. 7a-c a representation of a nozzle tube having three lateral discharge openings in a longitudinal section, cross section and detail.
Figure 7B:
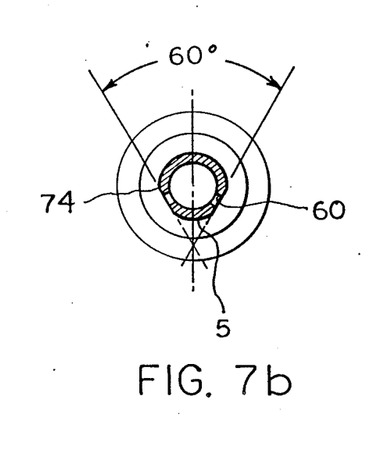
Figure 7C:
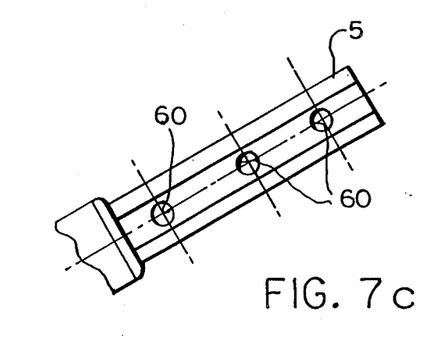

FIG. 7 shows another embodiment of a nozzle tube which is provided with three laterally disposed air discharge openings 60. These air discharge openings, which are shown in FIG. 7c in detail, are provided on both sides of the roof-like slope 14 of the nozzle tube. This roof-like slope 14 is disposed in the lower portion of the nozzle tube and narrows downwardly.

I claim:

1. A means for supplying additional air into the suction manifold of an internal combustion engine downstream of the throttle valve, said means comprising an additional air discharge device protruding into the suction manifold, a flow rate controller for the additional air, an additional air supply line between the additional air discharge device and the flow rate controller and a vacuum line leading from the suction manifold to the flow rate controller for the detection of vacuum and for the application of vacuum to the controller for the operation of the same, characterized in that the additional air discharge device is formed as a nozzle tube (5) which is associated with one combustion chamber of the internal combustion engine, respectively, which extends through a wall bore of the respective intake port (4) and which includes a throttle (12) and an air discharge opening (15) at the forward end thereof, said nozzle tube being disposed at the combustion chamber end of the intake port (4) directly adjacent to the inlet valve.

2. The means according to claim 1, characterized in that the nozzle tube (5) has a roof-like slope (14) in its portion protruding into the intake port (4).

3. The means according to claim 1 or 2, characterized in that the forward end (15) of the nozzle tube (5) is sloped towards the combustion chamber and the wall bore (at 16).

4. The means according to claim 1 or 2, characterized in that the vacuum line (8) opens into the intake port (4) in the range of the additional air discharge device approximately diametrically with regard to the same.

5. The means according to claim 1 or 2, characterized in that a vacuum control member (17) is provided between the detection position (10) of the vacuum line (8) at the intake port and the flow rate controller (7), said member varying the flow section of an opening (26) of the vacuum line (8) which is in connection with the atmosphere.

6. The means according to claim 1 or 2, characterized in that a check valve (18) blocking the flow section of the vacuum line is provided between the detection position (10) of the vacuum line (8) at the intake port (4) and the flow rate controller (7).

7. The means according to claim 1, characterized in that the flow rate controller (7) includes in a housing (20) a control chamber (21) and an additional air chamber (22) connected to the atmosphere and to the additional air supply line (6), and in that a working member (28) disposed in the control chamber (21) and biased by the atmosphere pressure on the one side and by the vacuum of the vacuum line (8) on the other side has a control member varying the flow section of the additional air chamber (22).

8. The means according to claim 7, characterized in that an air filter (25) is associated with the atmosphere connection (24) of the additional air chamber (22).

9. The means according to claim 7 or 8, characterized in that the additional air chamber (22) of the controller (7) is connected to a number of additional air supply lines (6) corresponding to the number of the combustion chambers of the internal combustion engine.

10. The means according to one of the claims 7 or 8, characterized in that the atmosphere connection (24) of the additional air chamber (22) of the controller (7) is realized from below and that the control member is formed as downwardly open hollow piston (26).

11. A means for supplying additional air into the suction manifold of an internal combustion engine downstream of the throttle valve, said means comprising an additional air discharge device protruding into the suction manifold, a flow rate controller for the additional air and an additional air supply line between the additional air discharge device and the flow rate controller, characterized in that the additional air discharge device is formed as nozzle tube (43) which is associated with one combustion chamber (40) of the internal combustion engine, respectively, which extends through a wall bore of the respective intake port (42) and which includes a throttle (12) and an air discharge opening (15, 60) at the forward end, said nozzle tube being located at the combustion chamber end of the intake port (42) directly adjacent to the inlet valve (41), and in that the flow rate controller (45) is controlled in response to the position of the throttle valve.

12. The means according to claim 11, characterized in that the nozzle tube (5) has a roof-like slope (14) in its portion protruding into the intake port (4, 42).

13. The means according to claim 11 or 12, characterized in that the forward end (15) of the nozzle tube (5, 43) is sloped towards the combustion chamber and the wall bore (at 16).

14. The means according to claims 11 or 12, characterized in that the air discharge opening (15) is disposed at the front side of the nozzle tube (15).

15. The means according to one of the claims 1, 2, 7, 8, 11 or 12, characterized in that at least one air discharge opening (60) is disposed laterally at the nozzle tube (5).

16. The means according to claim 3, characterized in that the roof-like slope (14) is provided in the downstream portion of the nozzle tube (5, 43) extending into the intake port (4), said nozzle tube (5, 43) narrowing in the downstream direction.

17. The means according to one of the claims 1, 2, 7, 8, 11 or 12, characterized in that a flutter valve is disposed within the nozzle tube (5, 43) said flutter valve being biased by a spring against the flow direction of the additional air.

18. The means according to one of the claims 11 or 12, characterized in that the roof-like slope (14) is provided in the downstream portion of the nozzle tube (5, 43) extending into the intake port (4), said nozzle tube (5, 43) narrowing in the downstream direction.

* * * * *